Patented Mar. 22, 1927.

1,621,528

UNITED STATES PATENT OFFICE.

CARLETON ELLIS, OF MONTCLAIR, NEW JERSEY.

COMPOSITION OF MATTER FOR TREATING ANIMAL TISSUE.

No Drawing.   Application filed September 21, 1921. Serial No. 502,285.

This invention relates to a composition of matter adapted for use as a tanning agent, preserving medium, for pharmaceutical purposes as for example as an astringent, and for other purposes and relates especially to a composition comprising aluminum chloride and a volatile solvent.

Solutions of aluminum chloride in water especially when the strength is above 10% possess an oily quality which does not allow of rapid penetration into wood, skin or other materials or surfaces which it is desired to treat with an astringent, tanning, preservative or disinfecting agent. If however the aluminum chloride is dissolved in a volatile solvent such as alcohol rapid penetration is obtained. Also the surface appears to dry more quickly. This is probably due to the fact that aluminum chlorides being a hygroscopic substance retains the water of solution tenaciously when used in aqueous form. On the other hand when an alcoholic solution is applied the alcohol quickly evaporates and the surface dries quickly. Owing to the penetrating character of this solution the aluminum chloride is distributed in the pores of the material well below the surface and a relatively dry surface thus results. The oily aqueous solution penetrates slowly and thus the surface remains wet and oily for an objectionable period.

Anhydrous aluminum chloride when dissolved in ethyl alcohol has substantially no deleterious action on the solvent. I have preserved strong alcoholic solutions of aluminum chloride for a period of several years exposed to daylight without blackening, resinification or other objectionable changes. A 20% solution of aluminum chloride in spirits of camphor has been preserved for a long period without substantial change, the aluminum chloride being active for an indefinite period and the alcohol evaporating without leaving objectionable residues due to any polymerization or reaction between the alcohol and other ingredients.

In place of ethyl alcohol, denatured alcohol, wood alcohol and others of the lower alcohols may be employed. Higher alcohols such as amyl or hexyl alcohol ordinarily are too costly and too slowly evaporating as well as possessing objectionable odors hence are not recommended for the present purpose, at least in its preferred aspects.

In some cases other solvents such as some of the volatile esters, ketones, etc., on which aluminum chloride has no deleterious condensing or polymerizing action may be employed.

In most cases I prefer to use strong alcohol that is, one containing at least 90 to 95% of alcoholic material but also may dilute with water for some purposes especially where a slight degree of oiliness is not objectionable. Thus a major proportion of alcohol or, in some cases, of water may be present in the solvent material depending on the intended application.

Aluminum chloride may be used in the anhydrous or hydrated form and in place of the chloride the bromide or other halogen compound or a mixture of the halides may be used, or any other suitable aluminum compound having the requisite solubility in an alcoholic medium. Various additions may be made to the solution such as resins, carbolic acid, camphor, menthol and essential oils, etc., depending on the purpose for which used and also taking into consideration the fact that aluminum chloride is a highly reactive substance and may have a deleterious action on any organic substance which also possesses reactive powers. Sometimes the reactivity of aluminum chloride may be reduced by the addition of a small amount of water to the alcoholic solution without employing enough water to precipitate any alcohol soluble bodies which may be present.

The concentration of the aluminum chloride forms a feature of the present invention, by preferably employing concentrations between 5 and 25% and in certain preferred specific types of solutions between the limits of 10 and 20%. These concentrations afford solutions of good penetration and other desirable properties. A sufficient quantity of aluminum chloride is present to exhibit an effective action for the purpose intended while at the same time the oiliness characteristic of strong aqueous solutions of aluminum chloride is absent so that distribution throughout the texture or pores of the fabric or skin or other material or surface which is being treated is secured.

While I preferably employ alcohol as the volatile solvent vehicle I do not limit myself thereto and in the appended claims where the term volatile alcoholic body is used it should be understood that it refers to any suitable volatile organic solvent medium functioning in the manner aforesaid.

In case the aluminum chloride employed is acid the excess acidity may be neutralized by treatment with ammonia in small amount. As is known dry ammonia forms with aluminum chloride a definite compound. When the liquid is being used in such a manner as to come in contact with the human body it is desirable to have the acidity low.

The composition may also be made in a paste or solid form or cream as for example by converting into an emulsion. Additions of fatty or oily material such as lanolin, spermaceti, petrolatum and the like may be made. Glycerin and tannic acid also may be added.

What I claim is:

1. A composition of matter adapted for treating animal tissues comprising aluminum halide dissolved in a solvent comprising a non-reactive, volatile penetrating organic solvent, the composition being stable, whereby the solution of the halide becomes rapidly absorptive by animal tissue.

2. A composition of matter adapted for treating animal tissues comprising aluminum halide dissolved in a solvent comprising a non-reactive volatile alcoholic body, the composition being stable, whereby the solution of the halide becomes rapidly absorptive by animal tissue.

3. A composition of matter adapted for treating animal tissues comprising aluminum halide dissolved in a solvent comprising alcohol and water, the composition being stable, whereby the solution of the halide becomes rapidly absorptive by animal tissue.

4. A composition of matter adapted for treating animal tissues comprising aluminum chloride dissolved in a vehicle comprising a volatile alcoholic solvent, the concentration of the aluminum chloride being between 5 and 25 percent, the composition being stable, whereby the solution of aluminum chloride becomes rapidly absorptive by animal tissue.

5. A composition of matter adapted for treating animal tissues comprising aluminum chloride dissolved in a solvent comprising alcohol, the free acidity of the chloride being neutralized by ammonia, the composition being stable, whereby the solution of aluminum chloride becomes rapidly absorptive by animal tissue.

CARLETON ELLIS.